US011907412B2

(12) United States Patent
Silverstein et al.

(10) Patent No.: US 11,907,412 B2
(45) Date of Patent: Feb. 20, 2024

(54) CONTEXTUAL SPECTATOR INCLUSION IN A VIRTUAL REALITY EXPERIENCE

(71) Applicant: International Business Machines Corporation, Armonk, NY (US)

(72) Inventors: Zachary A. Silverstein, Jacksonville, FL (US); Cesar Augusto Rodriguez Bravo, Alajuela (CR); Hemant Kumar Sivaswamy, Pune (IN); Carlos E Aguilera, Powder Springs, GA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 17/034,353

(22) Filed: Sep. 28, 2020

(65) Prior Publication Data

US 2022/0100261 A1   Mar. 31, 2022

(51) Int. Cl.
*A63F 13/213*   (2014.01)
*A63F 13/86*   (2014.01)
*G06F 3/01*   (2006.01)

(52) U.S. Cl.
CPC .......... *G06F 3/011* (2013.01); *A63F 13/213* (2014.09); *A63F 13/86* (2014.09); *A63F 2300/8082* (2013.01)

(58) Field of Classification Search
CPC .......... G06F 3/011; G06F 3/013; G06F 3/017; G06F 2203/011; A63F 13/213; A63F 13/86; A63F 2300/8082; A63F 13/211; A63F 13/212; A63F 13/25; A63F 13/428; A63F 13/5255

See application file for complete search history.

(56) References Cited

U.S. PATENT DOCUMENTS

| 9,844,704 | B2 * | 12/2017 | Thurman ............... A63B 60/46 |
| 10,245,507 | B2 | 4/2019 | Marks |
| 11,222,454 | B1 * | 1/2022 | Boissière ................ G06T 15/20 |
| 2009/0143139 | A1 * | 6/2009 | Fawcett ............... G10H 1/0091 381/119 |
| 2009/0288002 | A1 * | 11/2009 | Hamilton, II ......... G06F 3/0481 715/706 |
| 2014/0033044 | A1 * | 1/2014 | Goldman ............... G06Q 30/02 715/757 |

(Continued)

FOREIGN PATENT DOCUMENTS

| JP | 2011170761 A | * | 9/2011 |
| JP | 5834941 B2 | * | 12/2015 |

OTHER PUBLICATIONS

"AR/VR meets enterprise," IBM, accessed Sep. 25, 2020, 3 pages. <https://www.ibm.com/design/v1/language/experience/vrar/>.

(Continued)

*Primary Examiner* — Temesghen Ghebretinsae
*Assistant Examiner* — K. Kiyabu
(74) *Attorney, Agent, or Firm* — Grant M. McNeilly (57) ABSTRACT

A method of generating a virtual reality ("VR") experience includes detecting, using external sensors, a real-world spectator that is in a spectator space that is adjacent to a user that is wearing a VR headset and experiencing a VR space. The method also includes detecting a real-world physical state of the spectator, and rendering, in response to detecting, the spectator in the VR space as an avatar that reflects the real-world physical state of the spectator.

18 Claims, 6 Drawing Sheets

(56) References Cited

U.S. PATENT DOCUMENTS

| | | | | |
|---|---|---|---|---|
| 2014/0160149 | A1* | 6/2014 | Blackstock | G06N 3/006 345/619 |
| 2015/0235610 | A1* | 8/2015 | Miller | G02B 27/017 345/633 |
| 2015/0356781 | A1 | 12/2015 | Miller | |
| 2016/0066042 | A1* | 3/2016 | Dimov | H04N 21/4667 725/34 |
| 2016/0350973 | A1* | 12/2016 | Shapira | G06F 3/016 |
| 2017/0354875 | A1* | 12/2017 | Marks | A63F 13/213 |
| 2018/0005429 | A1* | 1/2018 | Osman | G06T 19/006 |
| 2018/0176661 | A1* | 6/2018 | Varndell | G06F 40/169 |
| 2018/0196506 | A1* | 7/2018 | Nakashima | G06F 3/017 |
| 2018/0199023 | A1* | 7/2018 | Ishikawa | H04N 13/128 |
| 2019/0099675 | A1* | 4/2019 | Khan | A63F 13/5255 |
| 2019/0102941 | A1 | 4/2019 | Khan | |
| 2019/0188895 | A1 | 6/2019 | Miller, IV | |
| 2019/0325633 | A1 | 10/2019 | Miller, IV | |
| 2020/0351321 | A1* | 11/2020 | Lueth | H04N 21/234 |
| 2022/0152506 | A1* | 5/2022 | Chiba | G06F 3/0481 |

OTHER PUBLICATIONS

"Artificial intelligence," IBM Developer, accessed Sep. 25, 2020, 7 pages. <https://developer.ibm.com/tutorials/use-ibm-watson-sdk-with-unity/>.

"How can I determine distance from an object in a video?" Stack Overflow, accessed Sep. 25, 2020, 9 pages. <https://stackoverflow.com/questions/2135116/how-can-i-determine-distance-from-an-object-in-a-video>.

"Smart Business," IBM, accessed Sep. 25, 2020, 6 pages. <https://www.ibm.com/services/insights/arvr-imagining-the-opportunities>.

Anonymous, "A Method and System for Experiencing Real Physical Immersion of People in Virtual Reality (VR) World," IP.com, Disclosure No. IPCOM000249332D, Feb. 16, 2017, 3 pages. <https://priorart.ip.com/IPCOM/000249332>.

Bailenson, "Virtual Reality's 'Consensual Hallucination,'" Slate.com, Jan. 29, 2018, 6 pages. <https://slate.com/technology/2018/01/virtual-reality-needs-to-be-able-to-re-create-in-person-social-interaction.html>.

Green, "IBM Watson Finds Its Way Into Games and Virtual Reality Applications," The Motley Fool, Feb. 21, 2018. 3 pages.

Gugenheimer et al., "ShareVR: Enabling Co-Located Experiences for Virtual Reality between HMD and Non-HMD Users," Proceedings of the 2017 CHI Conference on Human Factors in Computing Systems (CHI '17), May 6-11, 2017, pp. 4021-4033, https://doi.org/10.1145/3025453.3025683.

Mell et al., "The NIST Definition of Cloud Computing," Recommendations of the National Institute of Standards and Technology, U.S. Department of Commerce, Special Publication 800-145, Sep. 2011, 7 pages.

Prince et al., "3-D Live: Real Time Interaction for Mixed Reality," Proceedings of the 2002 ACM conference on Computer supported cooperative work (CSCW'02), Nov. 16-20, 2002, pp. 364-371. < https://www.researchgate.net/publication/220879135_3-D_live_Real_time_interaction_for_mixed_reality>.

* cited by examiner

CONTEXTUAL SPECTATOR INCLUSION IN A VIRTUAL REALITY EXPERIENCE

BACKGROUND

The present invention relates to generating a virtual reality ("VR") experience, and more specifically, to including real-world spectators in the VR experience.

VR experiences can involve a user immersing themselves in a fully virtualized environment. VR can be an extremely entertaining experience for the user, and spectators can also be entertained by watching the user engage the VR space. Because of the system requirements that support the VR experience can be large, there is often only one user in the experience, which can isolate the user from the spectators. Aside from audio communication between the user and the spectators, there can be a severe disconnect between the user and the spectators that can prevent a merged experience for all of the parties involved.

SUMMARY

According to an embodiment of the present disclosure, a method of generating a VR experience includes detecting, using external sensors, a real-world spectator that is in a spectator space that is adjacent to a user that is wearing a VR headset and experiencing a VR space. The method also includes detecting a real-world physical state of the spectator, and rendering, in response to detecting, the spectator in the VR space as an avatar that reflects the real-world physical state of the spectator.

According to an embodiment of the present disclosure, a VR system includes a VR controller including one or more processors and a computer-readable storage medium coupled to the one or more processors storing program instructions, the VR controller being configured to generate a VR experience. The VR system also includes a VR headset communicatively connected to the VR controller that is configured to display a VR space to a user, a sensor communicatively connected to the VR controller that is configured to monitor a spectator space proximate to the user, and a display communicatively connected to the VR controller that is viewable from the spectator space. The program instructions, when executed by the one or more processors, cause the one or more processors to perform operations including detecting, using the sensor, a person in the spectator space, analyzing the person to determine whether the person is a spectator, prompting, in response to determining that the person is a spectator, the person to opt-in to the VR experience, and rendering, in response to the person opting-in, an avatar in the VR space that represents the spectator.

According to an embodiment of the present disclosure, a method of generating a VR experience includes detecting, using external sensors, a real-world spectator that is in a spectator space that is adjacent to a user that is wearing a VR headset and experiencing a VR space. The method also includes analyzing the VR space to determine a VR context, and rendering, in response to analyzing, the spectator in the VR space as an avatar that reflects the VR context.

DETAILED DESCRIPTION

Intertwining the experience of the adjacent spectators and the user's VR experience, such as a game or cinema, can be beneficial to all parties. Therefore, the present disclosure presents a system and method wherein sensors (e.g., external cameras) can capture nearby adjacent individuals and render them into the VR space with appropriate context to the simulation and use visual cues to reflect their emotional and physical state in an avatar.

For one example, a user is playing a VR game while a spectator is in the room. The user wishes that the experience was more collaborative outside of just speaking to the spectator, and the spectator feels likewise. The VR system, using the sensors, finds the spectator and renders an avatar representing the spectator into the VR space. If the user is playing a mystery-themed game, then the spectator can be rendered as a moving/talking/reacting painting on a wall, for example. When the spectator jumps up and exclaims in excitement, the user can hear the spectator (through sound waves in the air, as normally), but the VR painting will also reflect the spectator's movement and emotions. For another example, if there are two users in separate rooms playing a competitive VR game, then the spectators for each user can be virtualized into the VR experience. More specifically, the spectators' avatars can be populated into the VR space as fans in the stands of the gaming arena, for example.

The software and hardware for these capabilities can be present in the VR system. The spectators can opt in to such a VR experience, and if they do, then motion capture equipment, such as sensors and/or cameras, can detect the spectators as long as they are physically inside of an active space proximate to the user. Then, the avatars can be rendered with expressions and movements (including mouth movements) that reflect the expressions and movements from their respective spectators. In addition, if a spectator leaves the active space, the system will animate the exit of their avatar in such a way that indicates that the spectator has left without being disturbing to the user. Similarly, if a spectator who has opted-in reenters the active space, the system will animate the entrance of their avatar in such a way that indicates that the spectator has rejoined the active space.

The avatars can be rendered in different locations which may correspond to or differ from the spectators' locations with respect to the user. The avatars can be predefined, for example, by each spectator, by the VR experience, or they can be generated using the context of the VR experience. For one example, the avatars can be generated using the form of animals or objects appropriate for the theme of the VR experience, such as, but not limited to, as bats in a VR experience in a cave or an abandoned home, as horse-flies in a VR experience involving horses, as painting on a wall in a building, etc.

Figure 1:
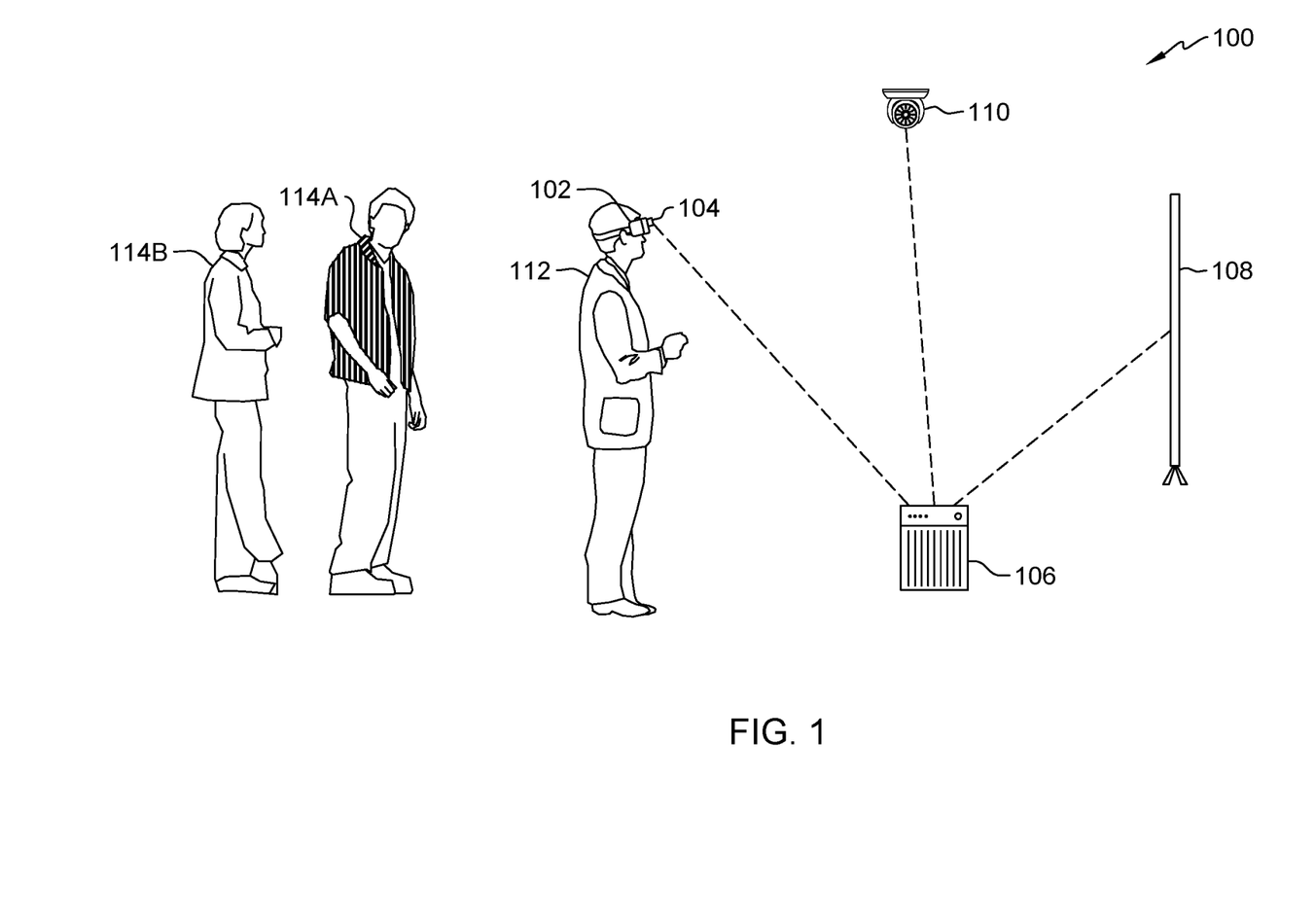
FIG. 1 shows a VR system with a user and two spectators, in accordance with an embodiment of the present disclosure.

Referring now to the Figures, FIG. 1 shows VR system 100 which comprises VR headset 102, headset camera 104, VR controller 106, display device 108, and ceiling-mounted camera 110. These components of VR system 100 are wirelessly connected together to provide a VR experience for user 112 who is wearing VR headset 102. In addition, display device 108 can show various portions of the VR experience (e.g., the view that user 112 is seeing) to allow persons 114A and 114B (collectively, "people 114") to see and participate in the VR experience.

In the illustrated embodiment, cameras 104 and/or 110 monitor a spectator area, which is an area proximate to user 112. For example, the spectator area can be the size of a room or a performance area, a 1 m to 5 m radius around user 112, or a 1.5 m to 4 m radius around user 112. Cameras 104 and/or 110 can include additional sensors, such as microphones. The information from cameras 104 and 110 can be sent to and analyzed by VR controller 106. VR controller 106 can detect and monitor people 114 in the spectator area. Furthermore, VR controller 106 can analyze people 114 to determine whether they are spectators (showing interest in the VR experience) or bystanders (present but uninvolved with the VR experience).

If VR controller 106 determines that one or more of people 114 are spectators, then VR controller 106 can prompt them to opt-in to the VR experience. This can occur, for example, using display device 108 and/or cameras 104 and/or 110. If any of people 114 wish to join the experience, they can acknowledge, for example, using a gesture or verbal speech. Once some or all of people 114 have opted-in, then they can be added to the VR space that is viewable by user 112. Thereby, any of people 114 who want to be spectators can be involved in the VR experience instead of merely observing it.

Figure 2:
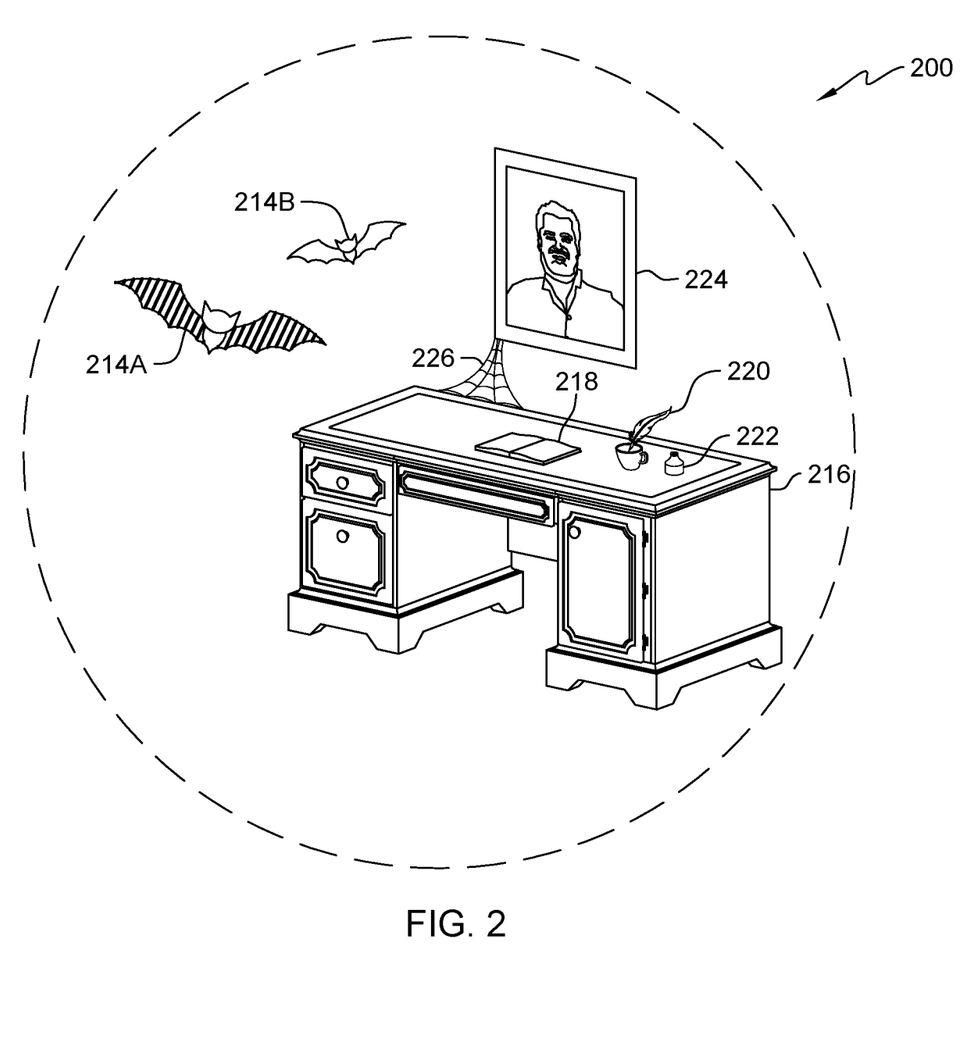
FIG. 2 shows a view of a VR space, in accordance with an embodiment of the present disclosure.

FIG. 2 shows VR view 200 of the VR space, for example, from the inside of VR headset 102 as user 112 would see it. VR view 200 includes avatars 214A and 214B (collectively, "avatars 214"), desk 216, book 218, pen 220, ink 222, painting 224, and spiderweb 226. Because VR view 200 takes place in the greater context of the real world (shown in FIG. 1), references may be made to the features of FIG. 1.

In the illustrated embodiment, people 114 have been recognized as spectators in the spectator space and have opted-in to the VR experience. Therefore, avatar 214A has been rendered in VR view 200 to represent person 114A, and avatar 214B has been rendered in VR view 200 to represent person 114B. Because cameras 104 and/or 110 can determine the relative and/or absolute locations of people 114 with respect to user 112 (for example, using temporal parallax), avatars 214 are sized and positioned accordingly in the VR space. For example, because person 114A is closer than person 114B to user 112 in the real world, avatar 214A appears larger than avatar 214B in VR view 200.

In the illustrated embodiment, avatars 214 have the form of bats, although there are many other forms that avatars 214 could take. For example, the avatar forms can be human or non-human; animal, machine, or fantasy creature; stationary (e.g., painting 224) or mobile (e.g., with the ability to swim, crawl, walk, roll, and/or fly). Thereby, the avatar forms can be, for example, birds, bats, insects (e.g., flies, beetles, or spiders), drones, balloons, fairies, sprites, or ghosts.

In some embodiments, VR controller 106 has a predetermined set of avatar forms that can be chosen from by user 112 and/or the corresponding person 114. In some embodiments, the VR experience (i.e., the software being run by VR controller 106) will have a list of predetermined avatar forms. In some embodiments, VR controller 106 can suggest, restrict, or choose the available avatar forms based on the context of the VR experience. The context of the VR experience can be determined in a number of ways using, for example, a convolutional neural network ("CNN"). For example, VR controller 106 can use natural language processing ("NLP") to analyze a description of the current VR experience (e.g., from the product literature of the software or from publicly available reviews on the Internet). For another example, VR controller 106 can classify the environment and/or ambience of the VR experience. For another example, VR controller 106 can analyze the objects that are near user 112 in the VR space. For another example, VR controller 106 can analyze VR view 200 (e.g., the lighting effects). For another example, VR controller 106 can analyze words, sounds, and/or music in the VR experience. During the analysis of the context of the VR experience, factors such as color themes, geography, wildlife, characters, architecture, vehicles, apparel, language, speech patterns, time period, fictional beings, and/or non-player characters ("NPCs") can be taken into consideration. For example, because the VR experience being depicted in FIG. 2 is that of an abandoned home (e.g., as evidenced by spiderweb 226), avatars 214 have the form of bats to reflect the spooky environment.

In addition to the form, in some embodiments, the appearance of avatars 214 can be customized to reflect the real-world physical state of their corresponding people 114. The physical state of a person 114 can include their appearance, motions, expressions, and sounds (e.g., utterances and noises). While sometimes the reflection of people 114 in avatars 214 is identical, other times the reflection is modified. For examples related to appearances, in some embodiments, an avatar 214 can include a rendering of the face of its corresponding person 114 (although other embodiments are face-blind). In some embodiments, an avatar 214 can include a color and/or pattern of the apparel being worn by its corresponding person 114. For example, avatar 214A has black-and-white stripes on its wings to reflect the black-and-white stripes on the shirt of person 114A. For examples of motions, in some embodiments, movements of the body and large gestures by people 114 are monitored by VR system 100 and reflected in the VR state of the respective avatars 214. This can include relative motion between user 112 and people 114, as well as movements in place such as jumping or arm waving. For examples of expressions, in some embodiments, subtle movements of extremities and/or static poses including facial expressions and hand gestures can be reflected in the VR state of the respective avatars 214.

For examples of sounds, in some embodiments, utterances (e.g., spoken words or yelling) and noises (e.g., clapping) can be reflected in the VR states of avatars 214. Because user 112 can hear the sounds from people 114 through the air in a normal manner, reflecting the sounds in the VR states of avatars 214 may be done in ways besides generating more sound in the VR experience. For example, the colors of avatars 214 can be changed depending on the types of sounds (or lack thereof) from people 114. However, in an embodiment where there is a large stadium of VR fans (e.g., in a sports arena), the sounds of people 114 can be transformed in such a way to make it sound like there is a whole stadium of people making those sounds. Furthermore, in such embodiments, avatars 214 can compose the same number of VR fans as there are people 114. Alternatively, more VR fans can be in the form of avatars 214 that reflect the physical states of people 114. In addition, when significant events occur in the VR experience, the VR fans could represent the physical states of people 114, essentially becoming avatars 214 in a more limited sense (e.g., their appearances may stay the same but their movements may reflect those of people 114).

Because avatars 214 can reflect the physical states of people 114, avatars 214 reflect the emotional states of people 114. This can allow user 112 to see the reactions of people 114 to the VR experience such that people 114 are both witnessing the VR experience and adding to the VR experience. This can provide a more satisfying experience for both people 114 and user 112 and can also allow people 114 to give non-verbal feedback to user 112. For example, if the VR experience is a tour of a proposed building designed by user 112, people 114 (e.g., the customers) can follow the tour and engage with user 112. This can allow user 112 to gauge the enthusiasm of people 114 for the design, as well as allow people 114 to point to places that they want the tour to go to without having to verbally explain them in detail.

Figure 3:
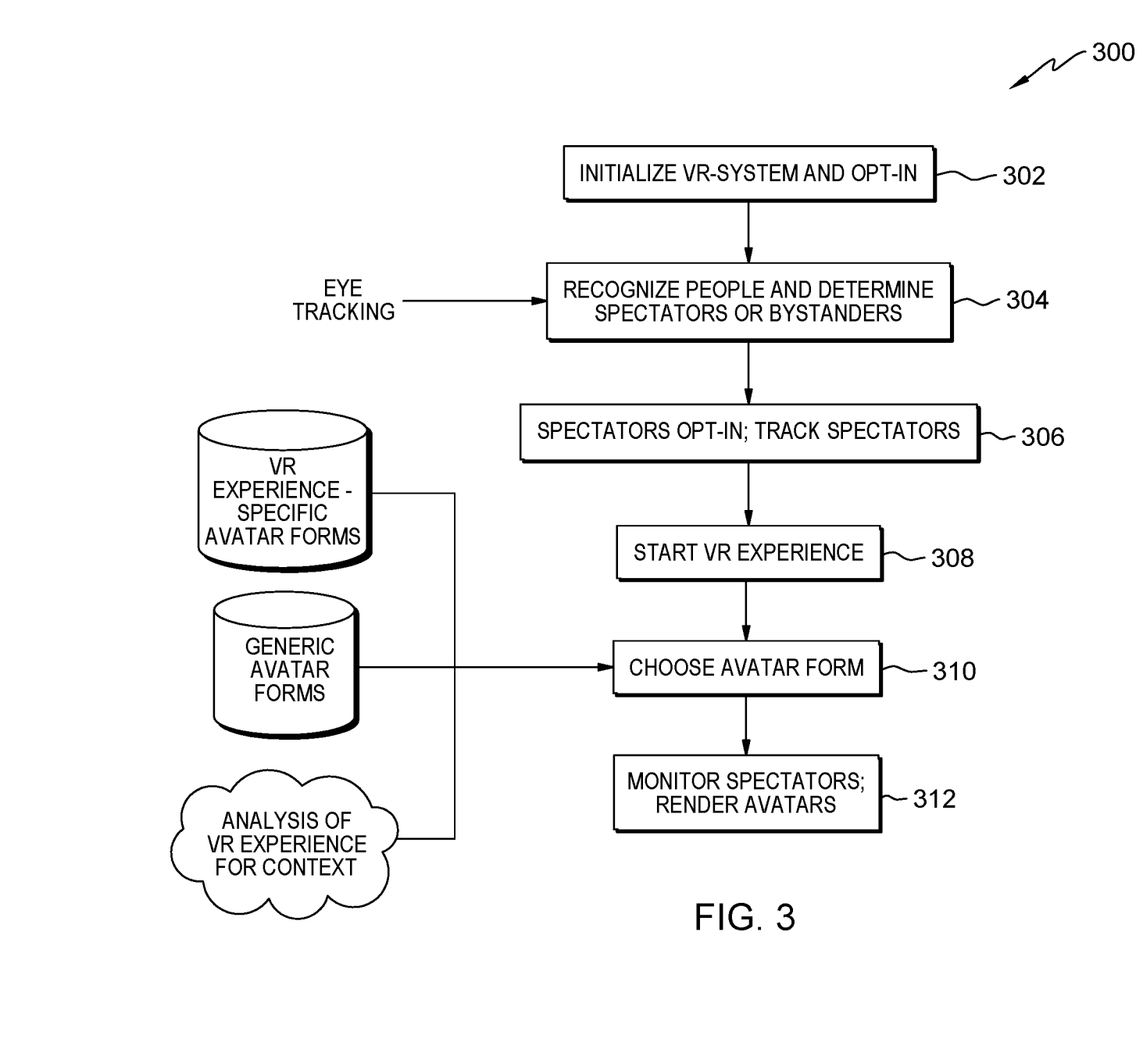
FIG. 3 shows a flowchart of a method of generating a VR experience, in accordance with an embodiment of the present disclosure.

FIG. 3 shows a flowchart of method 300 of generating a VR experience. During the discussion of method 300, references may be made to the features of FIGS. 1 and 2. In the illustrated embodiment, at block 302, user 112 initializes VR system 100, and opts-in to including avatars 214 of spectators in the VR experience. At block 304, VR system 100 recognizes people 114 in the spectator area and determines whether they are spectators or bystanders. The determination at block 304 can be made for each person 114 separately based on, for example, tracking of eye movements of each person 114. More specifically, if a person 114 is watching display device 108 for a significant amount or percentage of time, then the person 114 is considered a spectator. On the other hand, if the person 114 is not looking at display device 108 a significant amount or percentage of the time (e.g., if they are doing another activity in the spectator area, such as reading), then the person 114 is considered a bystander, in some embodiments.

At block 306, any people 114 deemed spectators (e.g., person 114A and person 114B) are asked to opt-in to the VR experience. If they do, then VR system 100 makes a note of their appearance to identify, monitor, and track them, for example, to place their avatar 214 in the correct location in the VR space and to make their avatar 214 have the proper appearance to reflect the physical state of their person 114. At block 308, the VR experience is started. At block 310, the forms of avatars 214 are chosen. The determination at block 310 can be made by, for example, a mandate from the VR experience software, generic forms available in VR system 100, analysis of the context of the VR experience, and/or choice by user 112 or people 114. Furthermore, avatars 214 can be customized based on the real-world appearances of people 114.

At block 312, people 114 are monitored by VR system 100, and avatars 214 are rendered in VR view 200 to reflect the real-world physical states of people 114, respectively. Block 312 can last until the end of the VR experience. However, additional steps can occur in some situations that may occur during the VR experience. For example, if another person 114 enters the spectator area after block 308, this person 114 can be detected by VR system 100. Then, VR system 100 can execute steps (a la blocks 304 and 306) to determine if this person 114 is a spectator. If so, then VR system 100 can ask this person 114 to opt-in in a manner that does not disturb user 112. For example, the opt-in request can be presented on display device 108 but not in VR headset 102 or VR view 200. Then this person 114 can use sound and/or motion to accept. Then VR system 100 can continue to monitor people 114 (including this new person 114) at block 312.

For another example of additional steps, during the VR experience, person 114A may exit the spectator area. In such a situation, it may be jarring or distracting to user 112 if avatar 214A were to instantaneously disappear. Therefore, an animation can be played to indicate that person 114A is no longer considered a spectator. Such animations can be, for example, avatar 214A flying away, going through a portal, fading away (e.g., increasing the transparency), or disappearing into a cloud of smoke. Such animations can ease the transition from avatar 214A existing to being absent, although sometimes attention may want to be called to the departure of avatar 214A. In that case, a more dramatic effect can be used, such as avatar 214A evaporating in a burst of electricity. Similarly, when VR system 100 recognizes that person 114A has returned to the spectator area, another animation can be played. Such entering animations can be reversals of the exiting animations, or they can be their own distinct animations. It should be noted that the exiting and entering animations can be played when any of people 114 cease or resume being spectators, respectively, due to whether they are paying attention to the VR experience (e.g., looking at display device 108). Furthermore, the entering animation can be played after person 114A opts-in to the VR experience and their avatar form is chosen and customized, which introduces avatar 214A into the VR experience.

In addition, in some embodiments, avatars 214 are rendered depending on the activity of people 114. For example, if people 114 are quietly watching display device 108, then avatars 214 may be absent from VR view 200. But when people 114 begin jumping and cheering (e.g., because of an exciting event in the VR experience), then avatars 214 can be rendered. Furthermore, VR controller 106 can record or annotate (a.k.a., tag) a recording of the VR experience in response to a dramatic and/or loud expression by people 114. Such a recording or annotation can allow user 112 to review the most exciting portions of the VR experience, for example, to make a highlight reel. In some embodiments, audience participation can be factored into the VR experience in other ways than just avatars 214. For example, dramatic and/or loud expressions by people 114 can boost the abilities, score, and/or experience points of user 112, which further closes the gap between a player and their spectators (e.g., in an e-sport VR experience).

Figure 4:
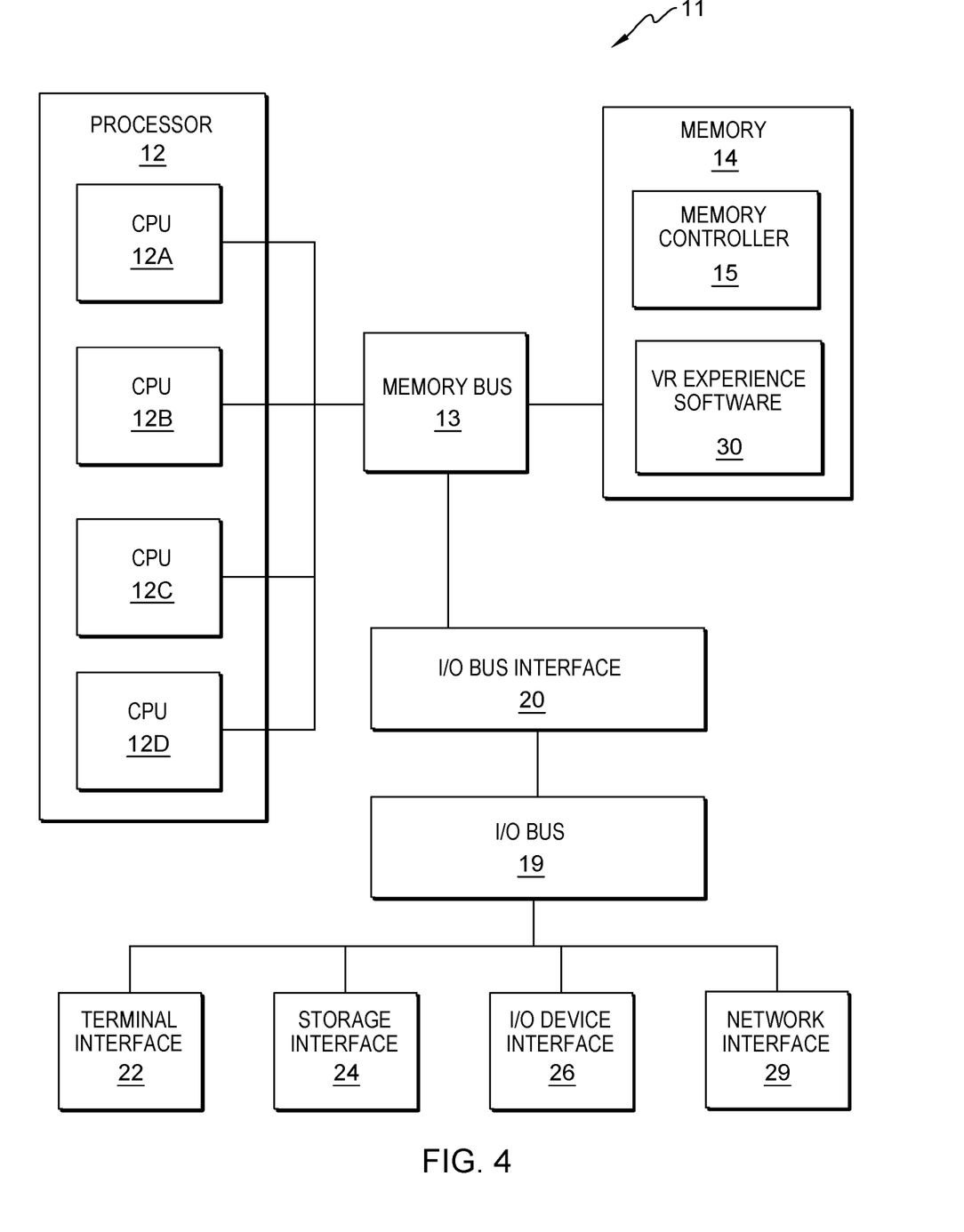
FIG. 4 shows a high-level block diagram of an example computer system that can be used in implementing embodiments of the present disclosure.

Referring now to FIG. 4, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used for VR headset 102, VR controller 106, and display device 108 (shown in FIG. 1). In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 4 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes VR experience software 30. The execution of VR experience software 30 enables computer system 11 to perform one or more of the functions described above in operating a VR experience, including detecting and monitoring people 114 and rendering avatars 214A and 214B in the VR space if appropriate (for example, blocks 302-312 shown in FIG. 3).

It is noted that FIG. 4 is intended to depict representative components of an exemplary computer system 11. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
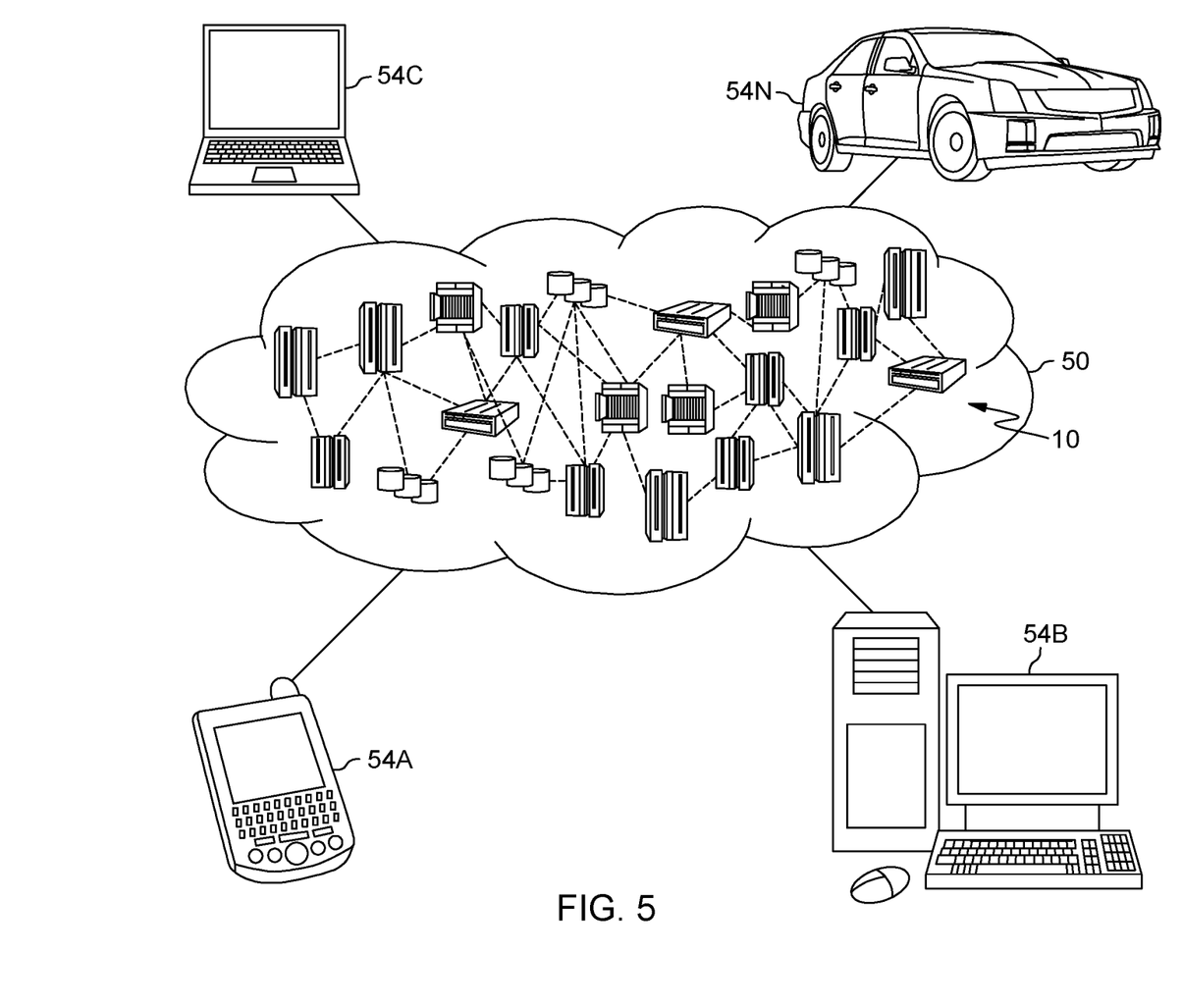
FIG. 5 shows a cloud computing environment, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
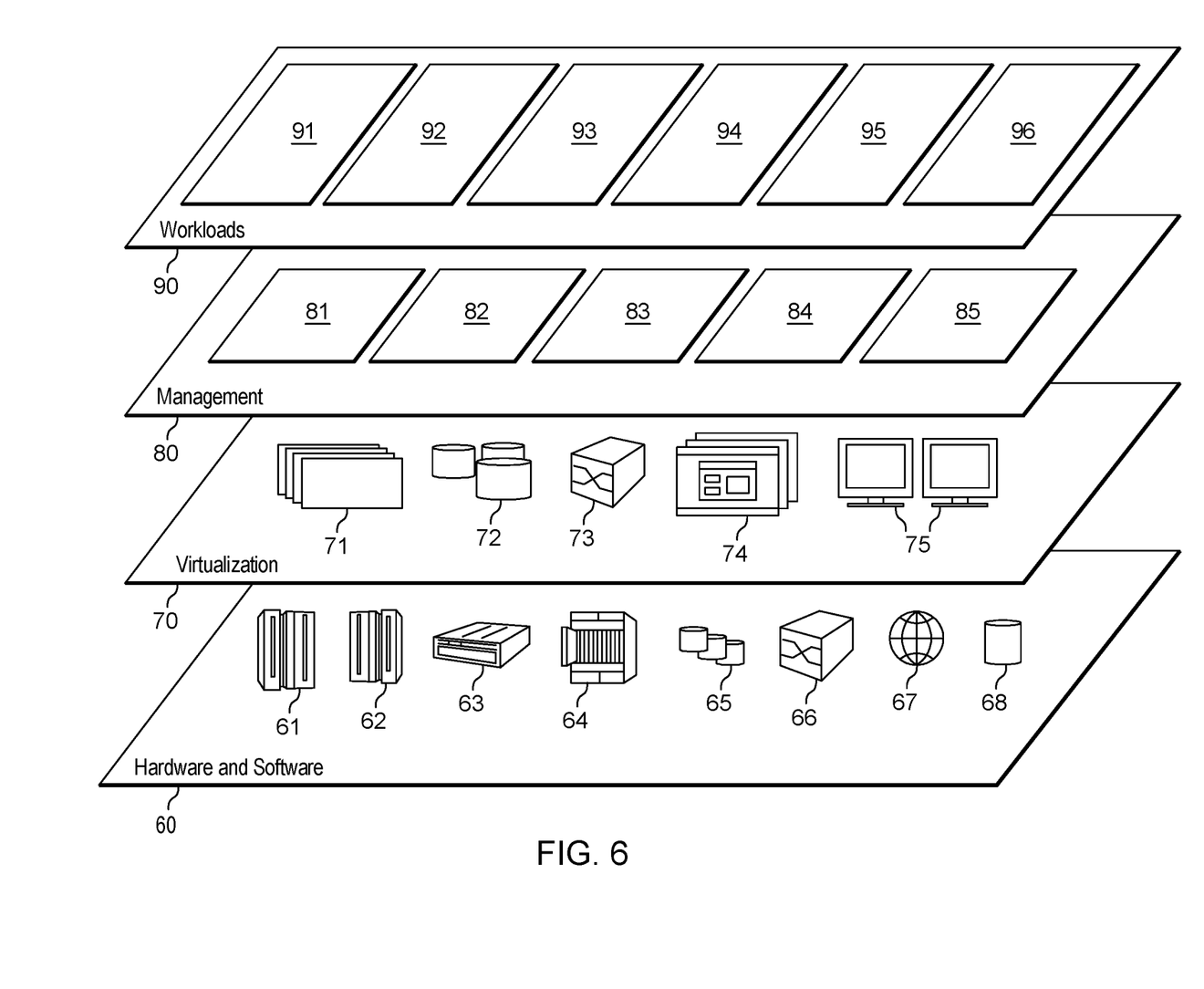
FIG. 6 shows abstraction model layers, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. s depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VR experience operation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a virtual reality ("VR") experience, the method comprising:
    detecting, using external sensors, a real-world spectator that is in a spectator space that is adjacent to a user that is wearing a VR headset and experiencing a VR space;
    detecting a real-world physical state of the spectator comprising sounds of the spectator;
    rendering, in response to detecting the real-world physical state of the spectator, the spectator in the VR space as an avatar that reflects the real-world physical state of the spectator;
    rendering a plurality of VR fans in the VR space;
    boosting experience points of the user based on sounds from the spectator; and
    transforming the sounds of the spectator to make the sounds sound like they are being made by at least some of the plurality of VR fans;
    wherein the real-world physical state of the spectator reveals a real-world emotional state of the spectator;
    wherein the avatar reflects the real-world emotional state of the spectator; and wherein at least some of the plurality of VR fans reflect the real-world movements of the spectator, facial expressions of the spectator, or gestures of the spectator.

2. The method of claim 1, wherein detecting the real-world physical state of the spectator is selected from the group consisting of detecting gestures of the spectator, detecting facial expressions of the spectator, detecting utterances of the spectator, and detecting noises of the spectator.

3. The method of claim 1, wherein:
the real-world physical state of the spectator includes apparel worn by the spectator; and
the avatar is rendered to reflect a color and/or a pattern of the apparel.

4. The method of claim 1, wherein a form of the avatar is a non-human entity.

5. A virtual reality ("VR") system comprising:
a VR controller including one or more processors and a computer-readable storage medium coupled to the one or more processors storing program instructions, the VR controller being configured to generate a VR experience;
a VR headset communicatively connected to the VR controller that is configured to display a VR space to a user;
a sensor communicatively connected to the VR controller that is configured to monitor a spectator space proximate to the user;
a display communicatively connected to the VR controller that is viewable from the spectator space; and
boosting experience points of the user based on sounds from the spectator;
wherein the program instructions, when executed by the one or more processors, cause the one or more processors to perform operations comprising:
detecting, using the sensor, a first person in the spectator space;
analyzing the first person to determine whether the first person is a spectator or a bystander based on whether the first person is engaged in another activity that is unrelated to the VR system;
prompting, in response to determining that the first person is a spectator because the first person is not engaged in the another activity, the first person to opt-in to the VR experience; and
rendering, in response to the first person opting-in, an avatar in the VR space that represents the spectator.

6. The VR system of claim 5, wherein the sensor comprises:
a first plurality of cameras mounted on the VR headset; and
a second plurality of cameras that are mounted off of the VR headset.

7. The VR system of claim 5, wherein rendering the avatar in the VR space that represents the spectator comprises:
rendering an entrance animation in the VR space involving the avatar in response to the first person opting-in.

8. The VR system of claim 5, wherein rendering the avatar in the VR space that represents the spectator comprises:
rendering an exit animation in the VR space involving the avatar in response to the first person leaving the spectator space.

9. The VR system of claim 8, wherein rendering the avatar in the VR space that represents the spectator comprises:
rendering an entrance animation in the VR space involving the avatar in response to the first person reentering the spectator space.

10. The VR system of claim 5, wherein the program instructions, when executed by the one or more processors, cause the one or more processors to perform operations further comprising:
determining that the first person is no longer a spectator based on eye movements of the first person; and
rendering an exit animation in the VR space involving the avatar in response to determining that the first person is no longer a spectator.

11. The VR system of claim 5, wherein the program instructions, when executed by the one or more processors, cause the one or more processors to perform further operations comprising:
detecting, using the sensor, a second person in the spectator space;
analyzing the second person to determine whether the second person is a spectator or a bystander based on whether the second person is engaged in another activity that is unrelated to the VR system;
determining that the second person is a bystander in response to the second person being engaged in the another activity; and
declining to prompt, in response to determining that the second person is a bystander, the second person to opt-in to the VR experience.

12. A method of generating a virtual reality ("VR") experience, the method comprising:
detecting, using external sensors, a real-world spectator that is in a spectator space that is adjacent to a user that is wearing a VR headset and experiencing a VR space;
analyzing the VR space to determine a VR context, wherein analyzing the VR space to determine the VR context comprises analyzing music in the VR experience;
rendering, in response to analyzing, the spectator in the VR space as an avatar that reflects the VR context;
detecting a real-world physical state of the spectator comprising sounds of the spectator;
rendering, in response to detecting the real-world physical state of the spectator, the spectator in the VR space as an avatar that reflects the real-world physical state of the spectator;
boosting experience points of the user based on sounds from the spectator; and
recording a portion of the VR experience in response to a dramatic and/or loud expression by the spectator.

13. The method of claim 12, wherein a form of the avatar is a non-human entity.

14. The method of claim 12, wherein analyzing the VR space to determine the VR context further comprises:
analyzing the VR space for color themes, geography, wildlife, characters, architecture, vehicles, apparel, language, speech patterns, time period, and/or fictional beings.

15. The method of claim 12, wherein analyzing the VR space to determine the VR context comprises:
analyzing a description of the VR space.

16. The method of claim 12, wherein rendering the spectator in the VR space comprises:
selecting an avatar from a predetermined list of avatars for the VR context.

17. The method of claim 12, wherein rendering the spectator in the VR space comprises:
rendering an entrance animation in the VR space involving the avatar.

18. The method of claim 12, wherein rendering the spectator in the VR space comprises:

rendering an exit animation in the VR space involving the avatar in response to the real-world spectator leaving the spectator space.

* * * * *